(12) United States Patent
Shiotsu et al.

(10) Patent No.: US 7,604,560 B2
(45) Date of Patent: Oct. 20, 2009

(54) PLANETARY ROLLER DRIVING DEVICE AND STEERING APPARATUS COMPRISING THE SAME

(75) Inventors: Isamu Shiotsu, Kasugai (JP); Hiroyuki Sonobe, Nagoya (JP); Takayoshi Hirayama, Nagoya (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 154 days.

(21) Appl. No.: 11/405,630

(22) Filed: Apr. 18, 2006

(65) Prior Publication Data
US 2006/0240937 A1    Oct. 26, 2006

(30) Foreign Application Priority Data
Apr. 21, 2005    (JP)    ............................ P2005-123260

(51) Int. Cl.
*F16H 37/02*    (2006.01)
(52) U.S. Cl. .................... 475/207; 475/342; 74/388 PS; 180/443
(58) Field of Classification Search ...................... 475/4, 475/7, 207, 343; 74/388 PS, 425, 665 A; 180/443, 444
See application file for complete search history.

(56) References Cited

U.S. PATENT DOCUMENTS 5,415,595 A * 5/1995 Nelson ........................... 475/7
6,705,424 B2 * 3/2004 Ogawa et al. ................ 180/446
6,837,824 B2 * 1/2005 Reimann et al. ............. 475/343
2003/0094329 A1  5/2003 Ogawa et al.
2005/0217922 A1 * 10/2005 Ozsoylu et al. ............. 180/443

FOREIGN PATENT DOCUMENTS

| DE | 102 24 758 A1 | 6/2003 |
| EP | 1 561 972 A2 | 8/2005 |
| JP | 1-139161 U | 9/1989 |
| JP | 2949604 B2 | 7/1999 |
| JP | 2001-30922 A | 2/2001 |
| JP | 2004-58896 A | 2/2004 |

* cited by examiner

Primary Examiner—David D. Le
(74) Attorney, Agent, or Firm—Birch, Stewart, Kolasch & Birch, LLP

(57) ABSTRACT

This planetary roller driving device includes: a planetary roller speed up gear having a first carrier being a first input axis and a first sun roller being a first output axis; a planetary roller reduction gear having a second sun roller being a second input axis and a second carrier being a second output axis, the second input axis being joined with the first output axis; a roller ring driving mechanism; a housing which accommodates the planetary roller speed up gear, the planetary roller reduction gear, and the roller ring driving mechanism; a roller ring rotation control circuit which controls a rotation of the roller ring driving mechanism corresponding to an external environmental condition; and a torque-assisting mechanism which is provided in the housing and provides an assisting torque to the first input axis or the second output axis.

5 Claims, 4 Drawing Sheets

PLANETARY ROLLER DRIVING DEVICE AND STEERING APPARATUS COMPRISING THE SAME

BACKGROUND OF THE INVENTION

Priority is claimed on Japanese Patent Application No. 2005-123260, filed Apr. 21, 2005, the contents of which are incorporated herein by reference.

1. Field of the Invention

The present invention relates to: a planetary roller driving device including a planetary roller transmission mechanism which can control rotational speed ratio between an input axis and an output axis to a predetermined value centering on 1:1 and a steering apparatus including the same.

2. Description of the Related Art

In accordance with improvements in a vehicle performance, a recent steering apparatus for a vehicle has improvements in easiness and safety of handling operation. This kind of steering apparatus includes a power-assisting device which assists power required for handling operation along with changing shifted rotational speed of a steering handle corresponding to the vehicle speed.

A steering apparatus including a conventional planetary roller driving device disclosed in Japanese Unexamined Patent Application, First Publication No. 2004-58896, changes shifted rotational speed of a steering handle by rotating inner gears of a planetary gear mechanism in the clockwise and in the counterclockwise using a speed-shifting motor. The inner gears are directly connected to a steering handle axis. In addition, this steering apparatus also enables maintaining constant rotational speed ratio by securing the inner gears using an electromagnetic plunger. Furthermore, by providing a power-assisting mechanism to a wheel steering rod, this steering apparatus controls the rotational-speed-controlling motor and the power assisting mechanism corresponding to the vehicle speed.

In addition, a conventional steering apparatus disclosed in Japanese Patent No. 2,949,604, has a construction of selectively driving and controlling a shifting speed variable mechanism and a power-assisting mechanism for a steering handle, using one driving motor and two electromagnetic clutches.

Furthermore, in a conventional steering apparatus disclosed in Japanese Unexamined Patent Application, First Publication No. 2001-30922, a planetary carrier of a planetary gear reduction mechanism having an input axis as a sun gear, is adopted as a reduction axis; and chain sprockets are fixed to the reduction axis. Through a chain engaged with the chain sprockets, a steering bar provided orthogonal to the reduction axis is moved left and right. The chain is guided by two idling sprockets which freely rotate around an axis of a rotational body which rotates around the reduction axis. And power-assisting for the steering bar is performed by rotational torque of the rotational body to which the idling sprockets are mounted and which is rotated by a motor. The steering apparatus has a construction of converting rotational movement to linear movement, and the construction enables deceleration of the moving steering bar at each rotational end side.

In a conventional steering apparatus disclosed in Japanese Unexamined Patent Application, First Publication No. 2004-58896, a reduction device directly connected to a steering handle axis and a planetary gear mechanism become a noise source. In addition, since a power-assisting mechanism is separately mounted on a position of a steering bar, an engine room becomes tight. Furthermore, since the steering apparatus has many parts, manufacturing cost thereof is high.

In a conventional steering apparatus disclosed in Japanese Patent No. 2,949,604, since a steering speed variable mechanism and a power-assisting mechanism are selectively controlled by one driving motor and two electromagnetic clutches corresponding to the vehicle speed, the steering apparatus cannot use these mechanisms together at the same time.

The conventional steering apparatus disclosed in Japanese Unexamined Patent Application, First Publication No. 2001-30922, has a problem in that the reduction rate of the moving steering bar on the swinging end sides are constant and cannot be controlled. In addition, since the steering apparatus is provided at a position of a steering bar, an engine room becomes tight.

The present invention has an object of providing: a planetary roller driving device which enables easy installation thereof by combining a steering speed changing mechanism having low noise and directly connected to an axis such as a steering handle, and a power-assisting mechanism in a one body; and a steering apparatus including the planetary roller driving device.

SUMMARY OF THE INVENTION

In order to achieve the above-mentioned object, the present invention adopts the followings.

(1) A planetary roller driving device of the present invention includes: a planetary roller speed up gear having a first carrier being a first input axis and a first sun roller being a first output axis; a planetary roller reduction gear having a second sun roller being a second input axis and a second carrier being a second output axis, the second input axis being joined with the first output axis; a roller ring driving mechanism which drives one of a first roller ring of the planetary roller speed up gear and a second roller ring of the planetary roller reduction gear; a housing which accommodates the planetary roller speed up gear, the planetary roller reduction gear, and the roller ring driving mechanism; a roller ring rotation control circuit which controls a rotation of the roller ring driving mechanism corresponding to an external environmental condition; and a torque-assisting mechanism which is provided in the housing and provides an assisting torque to the first input axis or the second output axis.

According to the planetary roller driving device, rotational speed changing mechanisms (i.e., the planetary roller speed up gear and the planetary roller reduction gear) and the torque-assisting mechanism are unitarily installed in the housing; therefore, when the planetary roller driving device is adopted for a steering apparatus of a vehicle, mounting onto a steering handle axis becomes easy and the engine room can secure enough space.

(2) The torque-assisting mechanism may include: a motor; a motor-directly-connected reduction gear which is directly connected to the motor; and an assisting torque control circuit which controls an output of the motor, and thereby controlling the assisting torque corresponding to the external environmental condition.

In this case, power-assisting for a driving power transmission axis (i.e., the first input axis or the second output axis) by the planetary roller driving device can be made by an output torque of the motor. Therefore, in the case in which the planetary roller driving device is adopted for a steering apparatus of a vehicle, when the vehicle stops or the vehicle speed is low, the steering handle can be rotated easily by large assisting-torque applied to the driving power transmission axis. Furthermore, while the vehicle is running in middle to high speed, too responsive handling operation can be avoided by reducing the assisting-torque.

(3) The motor-directly-connected reduction gear may be a worm reduction gear having a worm lead angle which prevents locking thereof even when a power is transmitted from a worm wheel to a worm.

When this torque-assisting mechanism is adopted for a steering apparatus of a vehicle, even though the worm reduction gear is used, it becomes possible to restore a steering wheel to a base position by reaction force transmitted from wheels.

(4) The motor-directly-connected reduction gear may be a worm reduction gear. The planetary roller driving device may further include an electromagnetic clutch which terminates the assisting torque to be transmitted when electrical current is not supplied to the motor.

In this case, when the electrical current is not supplied to the motor, handling operation can be performed while releasing a connection with the torque-assisting mechanism.

(5) The planetary roller driving device may further include an encoder which is directly connected to a worm axis of the worm reduction gear and measures a rotational angle of the worm axis.

In this case, providing the encoder which is directly joined to the worm axis enables more compact construction than providing an angle-measuring sensor to the steering handle axis. In addition, the encoder can more precisely measure the rotational angle of a driving power transmitting axis (i.e., the worm axis).

(6) A steering apparatus of the present invention includes: the planetary roller driving device according to any one of (1) to (5); a steering handle connected to the first input axis; and a steering device connected to the second output axis.

According to the steering apparatus, the same operations and the same advantageous effects can be obtained as those of the above-mentioned planetary roller driving device according to (1) to (5). Especially, in the case in which the rotational torque of the steering handle is transmitted by a friction roller while the changed rotational speed and power-assisting are transmitted by a worm gear, noise produced during handling operation can be suppressed. In this case, since slipping between the rollers can be prevented by using the friction roller and the worm gear together, the steering handle can be completely restored to a base position.

DETAILED DESCRIPTION OF THE INVENTION

Explanation will be made for a planetary roller driving apparatus of the present invention applied to that having a torque-assisting mechanism which is applicable to a steering apparatus for a vehicle, with reference to the drawings.

Figure 1:
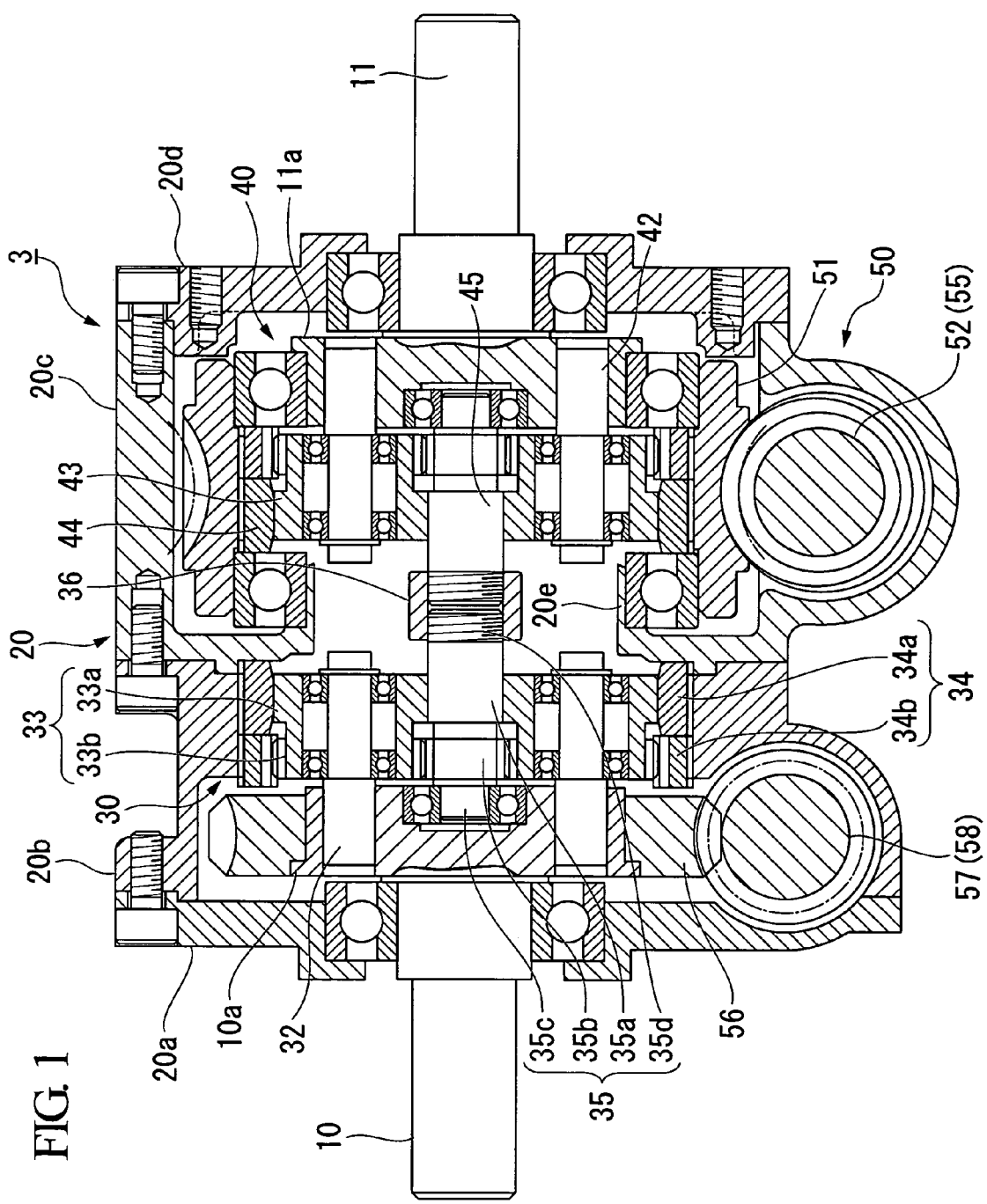
FIG. 1 is a side cross-sectional view of a planetary roller driving device including an assisting mechanism, according to a first embodiment of the present invention.
Figure 2:
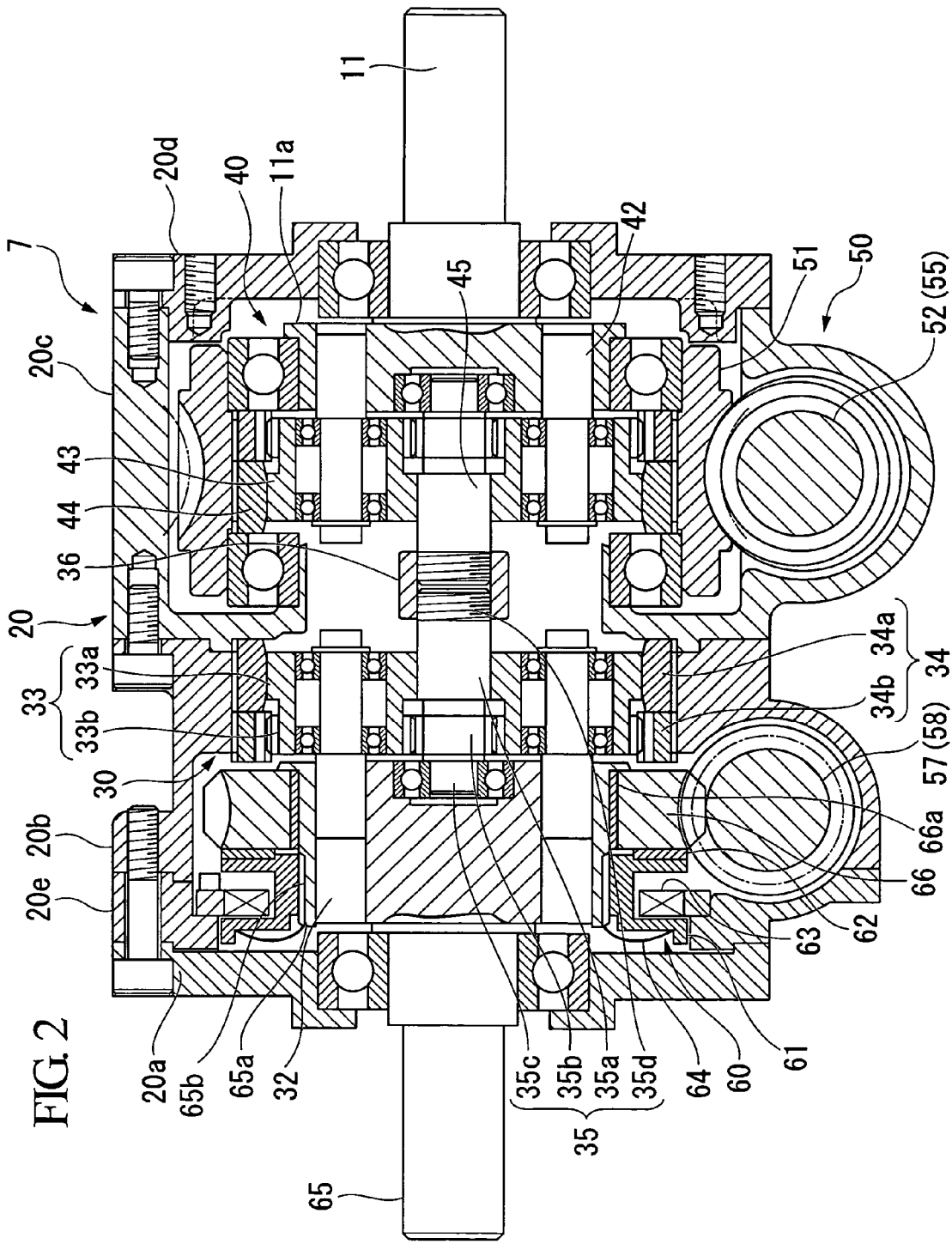
FIG. 2 is a side cross-sectional view of a planetary roller driving device including an electromagnetic clutch mechanism, according to a second embodiment of the present invention.
Figure 3:
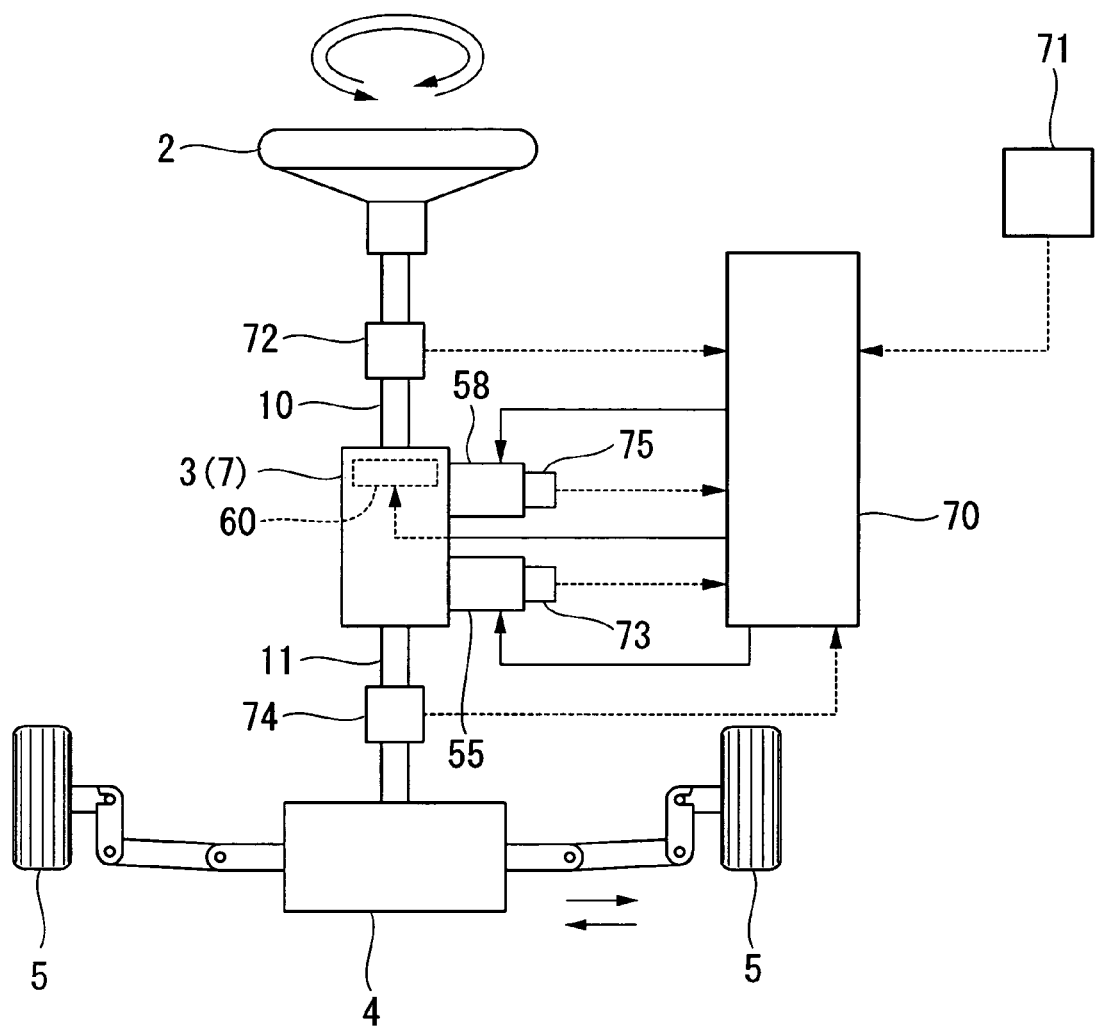
FIG. 3 is a schematic diagram of a steering apparatus provided in a vehicle having the planetary roller driving device of the present invention.
Figure 4:
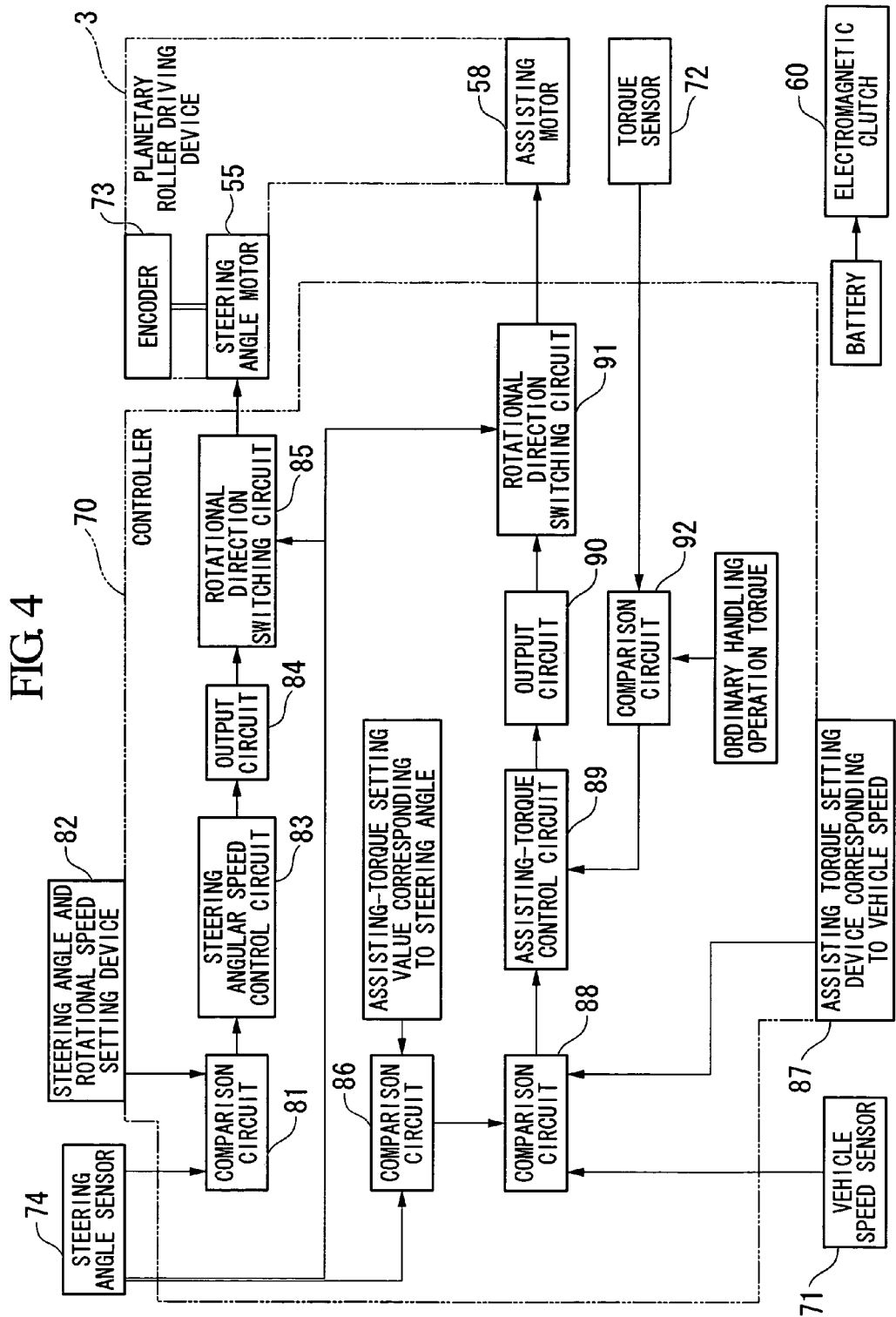
FIG. 4 is a block diagram showing a control process of the steering apparatus of the vehicle shown in FIG. 3.

FIG. 1 is a side cross-sectional view of a planetary roller driving device provided with an assisting mechanism on the side of a roller ring driving mechanism, according to a first embodiment of the present invention. FIG. 2 is a side cross-sectional view of a planetary roller driving device having an electromagnetic clutch mechanism in an assisting mechanism, according to a second embodiment of the present invention. FIG. 3 is a schematic diagram of steering apparatus provided in a vehicle having the planetary roller driving device shown in FIG. 1. FIG. 4 is a block diagram showing a control process of the steering apparatus of the vehicle shown in FIG. 3.

First Embodiment

In FIG. 1, the reference numeral 10 denotes an input axis while the reference numeral 11 denotes an output axis. The reference numeral 20 denotes a housing having substantially cylindrical shape. This housing 20 is provided with a front lid 20a including a front end wall, a front housing 20b, a rear housing 20c, and a rear lid 20d. These front lid 20a, front housing 20b, rear housing 20c, and rear lid 20d are joined with each other by bolts.

A planetary roller speed up gear 30 having a carrier (a first carrier) being an input axis (a first input axis) and a sun roller (a first sun roller) being an output axis (a first output axis), and a worm reduction gear (a worm wheel 56 and a worm gear 57) for power-assisting located at a position adjacent to the planetary roller speed up gear 30, are accommodated in a space formed by the front lid 20a and the front housing 20b. A planetary roller reduction gear 40 having a sun roller (a second sun roller) being an input axis (a second input axis) and a carrier (a second carrier) being an output axis (a second output axis), and a worm reduction gear (a roller ring driving device) 50 located at a position adjacent to the planetary roller reduction gear 40, are accommodated in a space formed by the rear housing 20c and the rear lid 20d.

The input axis 10 penetrates the front lid 20a and has a carrier 10a formed so as to be expanded in a thick disc shape. Bearings are provided in a hole formed at a center portion on a rear-side surface of the carrier 10a. A plurality of planetary pins 32 directing rearwards (i.e., towards the direction from the input axis 10 to the output axis 11) are provided so as to be perpendicular to the rear-side surface of the career 10a.

Planetary rollers 33 are each supported by the planetary pins 32 via bearings so as to be freely rotatable. The planetary rollers 33 are gear rollers each having a roller 33a, and a gear 33b formed unitarily and coaxially with the roller 33a. A large backlash is intentionally formed between the gears 33b, and a gear 34b to be engaged with the gears 33b. The backlash is for avoiding contacts between tooth surfaces between the gears while in an ordinary state in which an excessive torque is not applied, and thereby enabling smooth power transmission only by friction of the rollers 33a. This backlash is also provided: between the gear 33b and a gear 35b of a sun roller 35; between a gear of a planetary roller 43 of the planetary roller reduction gear 40 and a gear of a roller ring 44; and between the gear of the planetary roller 43 and a gear of a sun roller 45.

The reference numeral 34a denotes an inner ring having a rolling surface contacting with the roller 33a of the planetary roller 33 and formed thereinside. The reference numeral 34b denotes an inner gear engaging with the gears 33b. The roller ring 34 is constructed by the inner ring 34a and the inner gear 34b. The roller ring 34 has an outer spline formed in the periphery thereof; and the outer spline engages with an inner spline formed at an inner side of the front housing 20b. The inner ring 34a and the inner gear 34b are separable with each other in order to enable easy assembling thereof. The roller ring 44 of the planetary roller reduction gear 40 also has the same construction.

Rotational movements of the roller ring 34 with respect to the front housing 20b is prevented by the outer spline formed in the periphery thereof; however, the roller ring 34 is slightly movable in the radial direction, and thereby enabling free elastic deformation thereof. This construction enables preventing conventional problems such as tightening of the roller ring 34 into the front housing 20b, and local hardness change caused by a key or a pin fixed into the roller ring 34. The reference numeral 35 denotes a sun roller which is positioned so as to be coaxially with the input axis 10. The sun roller 35 has, as same as the planetary roller 33, a roller 35a and a gear 35b formed unitarily and coaxially with the roller 35a. A journal portion 35c is provided to the front end portion of the sun roller 35 while a spline shaft 35d is provided to the rear end portion of the sun roller 35.

The input axis 10 is rotationally supported by bearings provided in the front lid 20a which supports the journal portion formed in the more front side than the carrier 10a, and the roller ring 34 via the planetary pins 32 and the planetary rollers 33.

The sun roller 35 is rotationally supported by the planetary rollers 33 and bearings which support the journal portion 35c on the front side.

The spline shaft 35d formed in the rear side of the sun roller 35 is joined with the sun roller 45 of the planetary roller reduction gear 40 which will be mentioned later, by a sleeve joint 36 forming a spline hub.

The worm wheel 56 is fixed to the carrier 10a on the side of the planetary roller speed up gear 30. The worm gear 57 which engages with and drives the worm wheel 56 is supported by the front housing 20b via bearings. The worm gear 57 is driven by a power-assisting motor 58 (refer to FIG. 3) which is directly joined with the worm gear 57. A controller 70 (refer to FIG. 3) selects the rotational direction of the power-assisting motor 58; and an electrical power corresponding to an assisting torque necessary for the input axis 10 will be supplied to the power-assisting motor 58.

An engagement between the worm wheel 56 and the worm gear 57 is made such that self-locking therebetween can be prevented by adopting large worm lead angle. With this construction, the input axis 10 is rotatable even when power supply to the power-assisting motor 58 is terminated.

The planetary roller reduction gear 40 is a reduction gear having a sun roller being an input axis and a carrier being an output axis, and has substantially the same configuration as that of the planetary roller speed up gear 30. The planetary roller reduction gear 40 is accommodated in a space formed by the rear housing 20c and the rear lid 20d, so as to be located at position symmetry with respect to a position of the planetary roller speed up gear 30. The planetary roller reduction gear 40 differs from the planetary roller speed up gear 30 in the point in that the roller ring 44 is not secured to the rear housing 20b and is secured to the inner side diameter of the rotatable worm reduction gear 50.

A front end portion of the output axis 11 penetrates the rear lid 20d and is inserted into the rear housing 20c. The output axis 11 has a carrier 11a formed so as to be expanded in a thick disc shape. Bearings are provided around the carrier 11a. Planetary pins 42, the planetary rollers 43, the roller ring 44, and the sun roller 45 have substantially the same constructions as the corresponding elements of the planetary roller speed up gear 30.

The output axis 11 is rotationally supported by bearings provided in the rear lid 20d which supports the journal portion formed in the more rear side than the career 11a, and the rear housing 20c via the planetary pins 42, the planetary rollers 43, the roller ring 44, the worm wheel 51, and the bearings.

The reference numeral 51 denotes a worm wheel which is rotationally supported by the rear housing 20c via two bearings secured inside the worm wheel 51, and the carrier 11a. The front bearing (i.e., the bearing located on the input side) is supported by an arm portion having a cross-sectional L-shape which bends inwardly from a front end of the rear housing 20c and further bends rearward. The rear bearing (the bearing located on the output side) is fitted to an exterior of the carrier 11a so as to be held at the same cross-sectional position as the planetary pins 42 inserted into the carrier 11a (i.e., the same position in the axial direction of the output axis 11).

A spline hub is formed inside the worm wheel 51, and is engaged with an outer spline provided in the periphery of the roller ring 44.

The reference numeral 52 denotes a double lead worm gear engaging with the worm wheel 51. An input axis of the double lead worm gear 52 is joined with a steering angle motor 55 (refer to FIG. 3) being a servomotor secured to the rear housing 20c. The double lead worm gear 52 is rotationally supported by bearings at two ends thereof. The thrust of the double lead worm gear 52 is received by two angular bearings which faces with each other and is secured at the input power side. The engaging clearance between the double lead worm gear 52 and the worm wheel 51 can be adjusted so as to be minimum by adjusting the positions of these two angular bearings.

When the carrier 10a is rotated by rotating the input axis 10, the plurality of planetary pins 32 secured to the carrier 10a also rotate around the input axis 10. Furthermore, the planetary rollers 33 rotationally supported by the planetary pins 32 will be revolved in the reversed rotational direction with respect to the input axis 10 by friction force generated by a contact with the inner ring 34a. The sun roller 35 contacting with the planetary rollers 33 is driven by the friction therebetween so as to rotate in the same rotational direction as the input axis 10 while increasing the rotational speed.

The sun roller 35 and the sun roller 45 are joined by the sleeve joint 36; therefore, the sun roller 45 will transmit a driving power having the same rotational direction and the same rotational speed as those of the sun roller 35. This driving power passes though a reversed path with respect to the above-mentioned transmission path (i.e., a transmission path directing from the planetary rollers 43 to the planetary pins 42), and is thereafter transmitted to the output axis 11. The rotational ratio between the input axis 10 and the output axis 11 will be 1:1 in the case in which: the planetary rollers 33 and the planetary rollers 43 have the same roller diameters; the roller ring 34 and the planetary roller 43 have the same roller diameters; the sun roller 35 and the sun roller 45 have the same roller diameters; and the roller ring 44 is fixed by stopping the servomotor 55 of the worm reduction gear 50.

Rotating the worm wheel 51 in the same rotational direction as of the input axis 10 by activating the worm reduction gear 50 will reduce the rotation of the planetary rollers 43; thereby, reducing the speed reduction ratio. On the other hand, rotating the worm wheel 51 in the reversed rotational direction with respect to the input axis 10 will increase the rotation of the planetary rollers 43; thereby, increasing the speed reduction ratio. Namely, the rotational ratio between the input axis 10 and the output axis 11 increases or decreases corresponding to the value calculated by the rotational speed of the worm wheel 51 applied by the reduction ratio.

Since the double lead worm gear 52 can reduce the backlash of engaging, the reduction accuracy thereof will not be deteriorated even when the rotational directions thereof are changed frequently. In addition, since the double lead worm gear 52 is driven by the steering angle motor 55 directly joined with the double lead worm gear 52, an arbitrary reduction ratio can be obtained.

Since the planetary roller speed up gear 30 and the planetary roller reduction gear 40 perform torque transmission using friction forces generated between the rollers 33, 34, 35, 43, 44, and 45, transmission of the driving power will be performed silently and smoothly; therefore, enabling small play and quick response even when the planetary roller speed up gear 30 and the planetary roller reduction gear 40 perform reciprocal rotations.

Since gears each having the same pitch diameters as of the roller diameters of the rollers 33, 34, 35, 43, 44, and 45 are provided beside the rollers, slipping between the rollers can be suppressed even when a torque load exceeding the friction force between the rollers is applied. Accordingly, it is possible to prevent unintentional shift in the rotational angle between the input axis 10 and the output axis 11.

Second Embodiment

Like a planetary roller driving device 7 shown in FIG. 2, it is desirable to provide an electromagnetic clutch 60 when worm gears 57 and 66 of a power-assisting mechanism have lead angles that may cause self-locking therebetween, or when the input axis 10 requires heavy operation therefor due to large friction between the worm gears 57 and 66. In this case, when electrical current supply to the power-assisting motor 58 is terminated, the electromagnetic clutch 60 can automatically disconnect the power-assisting torque.

The electromagnetic clutch 60 is provided with: a ring-shaped magnetic body 61 having a cross-sectional U-shape and a female spline formed at an inner side thereof so as to be engaged with a spline of a carrier 65a and be movable along an axial direction; a friction plate 62 fixed to the magnetic body 61; an electromagnetic coil 63 attached to a thin housing 20e; and a restoring spring 64 which urges the magnetic body 61 towards a direction departing from the worm wheel 66, and has a star-shaped notch at an inner side thereof.

In order to install the electromagnetic clutch 60 into the input axis side, the input axis 10 is modified to an input axis 65 having a thicker disc portion formed by increasing the thickness of a carrier of the input axis 10; therefore, the reference numeral of the carrier is changed to 65a. The carrier 65a has the same shape as that of the carrier 10a of the first embodiment except for the extended axial length and a spline 65b provided in the periphery thereof. A bush 66a is secured inside the worm wheel 66 such that the worm wheel 66 fits to the periphery of the carrier 65a. Except for this construction, the worm wheel 66 has completely the same shape as that of the worm wheel 56. In order to accommodate the electromagnetic clutch 60, an internal volume on the input axis side of the housing 20 is increased by sandwiching the thin housing 20e between the front lid 20a and the front housing 20b.

Operations of the electromagnetic clutch 60 will be explained. While electrical current is supplied to the power-assisting motor 58, the electrical current flows through the electromagnetic coil 63 and thereby applying a magnetic force directing toward the direction departing from the worm wheel (i.e., towards left in FIG. 2) onto the magnetic body 61. Then the magnetic body 61 is pushed toward the worm wheel 66 side and the friction plate 62 contacts the worm wheel 66 and is urged. Then the power-assisting torque from the worm wheel 66 is transmitted to the career 65a via the magnetic body 61 and the spline 65b. If the electrical current supply to the power-assisting motor 58 is terminated due to accidents or the like, electrical current flowing through the electromagnetic coil 63 is simultaneously terminated, and thereby losing the magnetic force of the electromagnetic coil 63. Then the magnetic body 61 moves toward the side departing from the worm wheel 66 by the urging force of the restoring spring 64; and thereby the transmission of the power-assisting torque between the magnetic body 61 and the worm wheel 66 is disconnected. As a result, the magnetic body 61 is released from mechanical friction resistance of the power-assisting motor 58.

Moreover, in the planetary roller driving device 3 of the first embodiment and in the planetary roller driving device 7 of the second embodiment, the torque-assisting mechanism is provided to the side of the input axis 10 or 65, while a shifting-speed mechanism which rotates the roller ring 44 by the steering motor 55 is provided to the side of the output axis 11. However, with this construction, it may be arranged such that the input axis 10 or 65 is used as an output axis while the output axis 11 is used as an input axis.

The vehicular steering apparatus shown in FIG. 3 is provided with the planetary roller driving device 3 (or the planetary roller driving device 7) having the same construction as mentioned in the above; and the input axis 10 (or the input axis 65) and the steering handle 2 are directly joined with each other. A torque sensor 72 is provided to the input axis 10 (or the input axis 65) to measure handle operating torque applied to the steering handle 2. A steering angle sensor 74 is provided to the output axis 11 of the planetary roller driving device 3. The output axis 11 is joined with an input axis of the steering device 4. The steering device 4 converts rotational motion of the output axis 11 to linear motion in the horizontal direction, and thereby performing steering operation of wheels 5. The reference numeral 75 denotes an encoder directly connected to the rotational axis of the power-assisting motor 58. The reference numeral 73 denotes an encoder directly connected to the steering motor 55 which changes the rotational speed of the output axis 11 of the planetary roller driving device 3. The encoder 75 will precisely measure the rotational angle of the input axis 10 (or the input axis 65) while the power-assisting motor 58 is driving.

Hereinafter, control process of the vehicular steering apparatus will be explained with reference to the schematic diagram shown in FIG. 3, and control block diagram shown in FIG. 4.

While the vehicle is running, vehicular speed signal is transmitted from the vehicle speed sensor 71 to the controller 70. While operating the steering handle 2, the steering angle signal from the steering angle sensor 74 and the operating torque measured by the torque sensor 72 provided to the steering handle 2 (the input axis 10) are transmitted to the controller 70.

In the controller 70, the steering angle signal from the steering angle sensor 74 is transmitted to the comparison circuit 81. The comparison circuit 81 selects an angular velocity corresponding to the steering angle signal among the angular velocities set in a steering angle and rotational speed setting device; and thereafter drives the steering angle motor 55 in the selected angular velocity through a steering angular rotational speed control circuit 83, an output circuit 84, and a rotational direction switching circuit 85. The steering angle sensor 74 at this time detects the rotational direction (i.e., right or left) referring to an neutral point of the steering; and thereafter a rotational direction switching circuit 85 switches the flow direction of electrical current. Therefore, regardless of the rotational directions (right or left), the same steering angular speed change will be performed corresponding to the steering angle. Rotation of the steering angle motor 55 will be measured by the encoder 75. Signal from the encoder 75 is feedback to the steering angular speed control circuit 83. The steering angular speed control circuit 83 confirms whether the steering angle motor 55 is controlled to a setting speed, and adjusts the steering angle motor 55 in accordance with the necessity.

An assisting-torque control circuit 89 adopts a larger assisting torque between (i) an assisting torque selected by the comparison result by the comparison circuit 86 between the steering angle signal from the steering angle sensor 74 and "assisting-torque setting value corresponding to steering angle", and (ii) an assisting-torque selected by the comparison result by the comparison circuit 88 between a speed signal from the vehicle speed sensor 71 and an assisting-torque from the assisting-torque setting device corresponding to vehicle speed 87. The selected assisting-torque is transmitted through the output circuit 90 and the rotational direction switching circuit 91 to drive the assisting motor 58 in the selected assisting-torque. The rotational direction switching circuit 91 receives from the steering angle sensor 74, a signal indicating the rotational direction (i.e., clockwise or counterclockwise) of the steering handle, and switches the current flow direction corresponding to the rotational direction. Then the assisting torque with the selected rotational direction (i.e., clockwise or counterclockwise) is applied to the output axis 11. Signal from the torque sensor 72 indicates torque (of the steering handle) obtained by subtracting the assisting-torque from the torque corresponding to the actual handling power; therefore, the comparison circuit 92 compares between the torque and an ordinary handling operation torque, and controls the assisting torque so as not to have differences therebetween.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A planetary roller driving device comprising:
    a planetary roller speed up gear having a first carrier being a first input axis and a first sun roller being a first output axis;
    a planetary roller reduction gear having a second sun roller being a second input axis and a second carrier being a second output axis, the second input axis being joined with the first output axis;
    a roller ring driving mechanism which drives one of a first roller ring of the planetary roller speed up gear and a second roller ring of the planetary roller reduction gear;
    a roller ring rotation control circuit which controls a rotation of the roller ring driving mechanism corresponding to an external environmental condition;
    a torque-assisting mechanism which provides an assisting torque to the first input axis or the second output axis; and
    a singular housing which unitarily accommodates the planetary roller speed up gear, the planetary roller reduction gear, the roller ring driving mechanism, and the torque-assisting mechanism,
    wherein the torque-assisting mechanism includes:
    a motor-directly-connected reduction gear which is directly connectable to a motor, wherein the motor-directly-connected reduction gear is a worm reduction gear having a worm lead angle which prevents locking thereof even when a power is transmitted from a worm wheel to a worm axis, wherein
    the torque-assisting mechanism further includes an assisting-torque control circuit which controls an output of the motor, and thereby controlling said assisting torque corresponding to the external environmental condition, and
    wherein the planetary roller driving device further comprises an encoder which is directly connected to the worm reduction gear along the worm axis and measures a rotational angle of the worm reduction gear about the worm axis.

2. The planetary roller driving device according to claim 1, further comprising
    an electromagnetic clutch which terminates the assisting torque to be transmitted when electrical current is not supplied to the motor.

3. The planetary roller driving device according to claim 1, wherein the singular housing is directly mountable onto a steering handle axis.

4. The planetary roller driving device according to claim 1, wherein the second input axis is directly joined with the first output axis by a sleeve joint.

5. A steering apparatus comprising:
    the planetary roller driving device according to claim 1;
    a steering handle connected to the first input axis; and
    a steering device connected to the second output axis.

* * * * *